United States Patent [19]

Nagai et al.

[11] Patent Number: 5,218,450
[45] Date of Patent: Jun. 8, 1993

[54] APPARATUS FOR REPRODUCING INFORMATION FROM A RECORDING MEDIUM IN ACCORDANCE WITH A SEARCH COMMAND

[75] Inventors: Yoshihisa Nagai; Satoru Nomura, both of Yamanashi, Japan

[73] Assignees: Pioneer Electric Corporation, Tokyo; Pioneer Video Corporation, Yamanashi, both of Japan

[21] Appl. No.: 930,467

[22] Filed: Aug. 20, 1992

Related U.S. Application Data

[63] Continuation of Ser. No. 660,859, Feb. 26, 1991.

[30] Foreign Application Priority Data

Jun. 21, 1990 [JP] Japan .................................. 2-163740

[51] Int. Cl.⁵ ...................... H04N 5/76; G11B 21/08; G11B 21/10
[52] U.S. Cl. ................... 358/335; 358/342; 358/341; 358/343; 360/19.1; 360/72.2; 369/32; 369/44.28; 369/48
[58] Field of Search ............... 358/335, 341, 342, 343, 358/310; 369/32, 44.28, 30, 47, 48; 360/18, 19.1, 72.2

[56] References Cited

U.S. PATENT DOCUMENTS

| | | | |
|---|---|---|---|
| 4,641,204 | 2/1987 | Sugiyama | 358/341 |
| 4,646,278 | 2/1987 | Okano | 369/32 |
| 4,716,558 | 12/1987 | Katayama et al. | 369/32 |
| 4,949,323 | 8/1990 | Yoshido | 369/44.11 |
| 4,989,097 | 1/1991 | Yoshio et al. | 358/335 |
| 4,992,885 | 2/1991 | Yoshio | 358/341 |
| 4,992,886 | 2/1991 | Klappert | 358/341 |
| 5,016,113 | 5/1991 | Yamashita et al. | 358/342 |

*Primary Examiner*—Tommy Chin
*Assistant Examiner*—Khoi Truong
*Attorney, Agent, or Firm*—Keck, Mahin & Cate

[57] ABSTRACT

An information recording medium playing apparatus detects a preset memory command of every data unit of a graphics information signal of a subcode of a CD format signal which playing an information recording medium. During play operation, address data corresponding to the respective preset memory commands are constantly stored in a memory. In a search mode, the head of desired graphics information is searched on the basis of the address data stored in the memory.

5 Claims, 2 Drawing Sheets

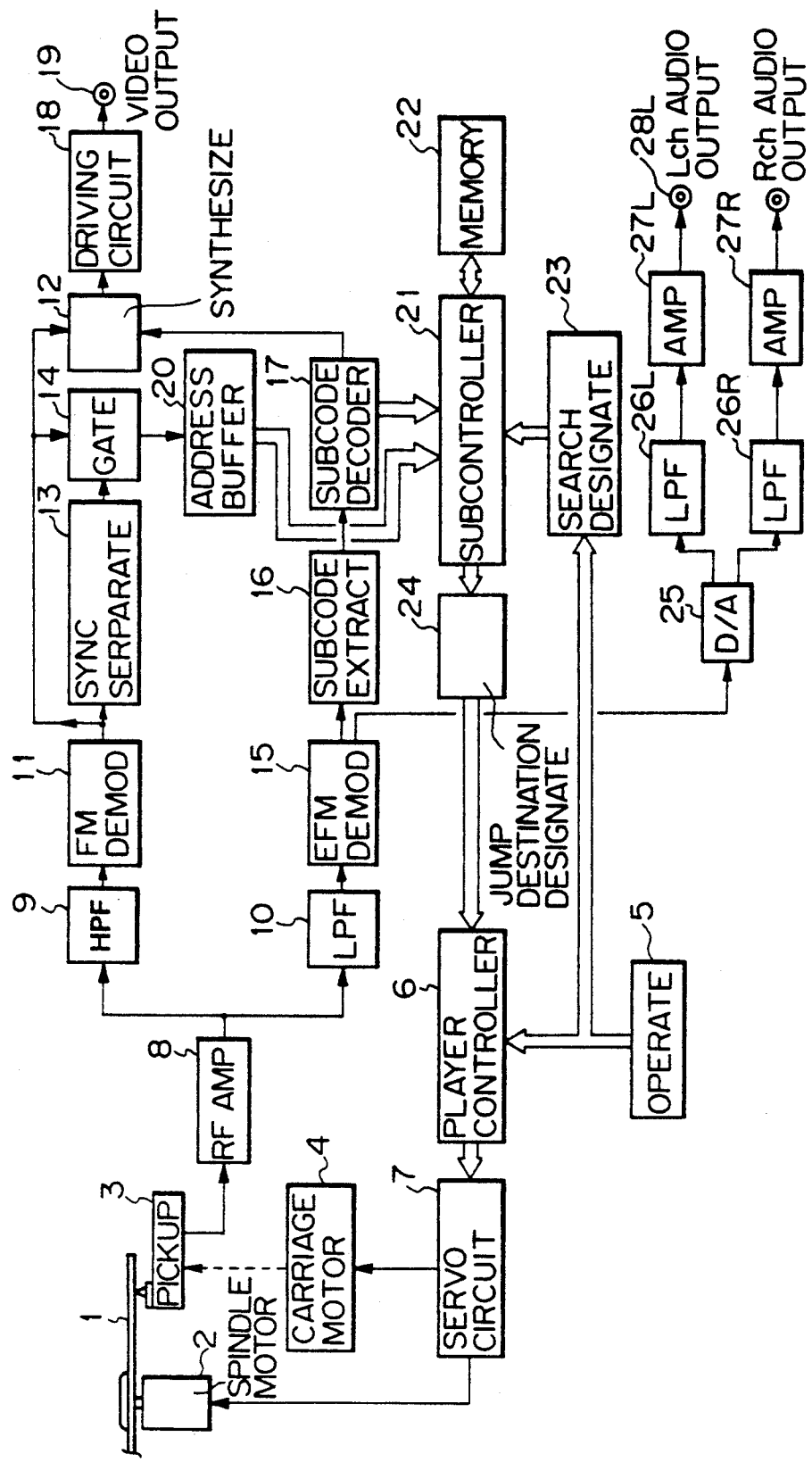

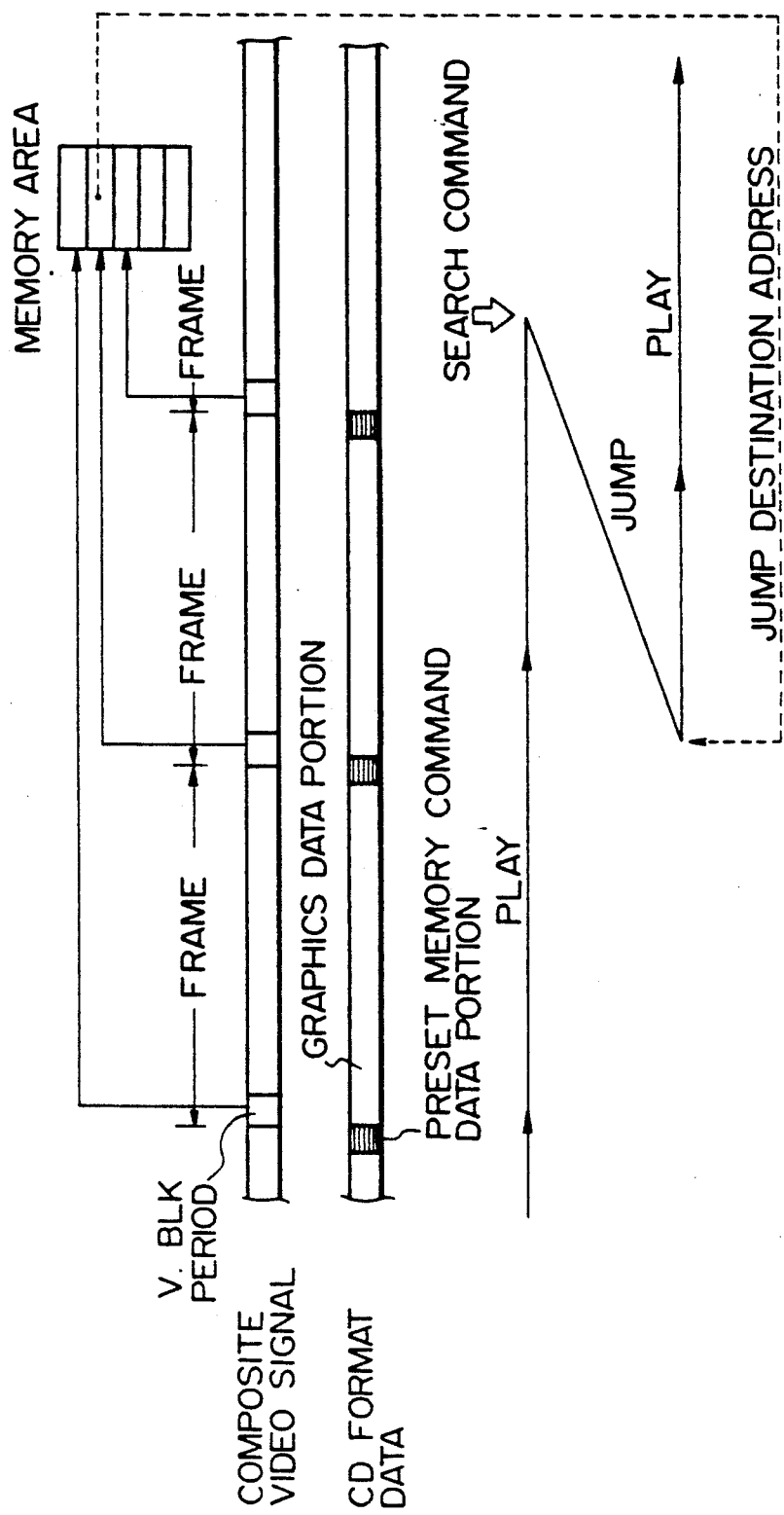

APPARATUS FOR REPRODUCING INFORMATION FROM A RECORDING MEDIUM IN ACCORDANCE WITH A SEARCH COMMAND

This is a continuation of application Ser. No. 07/660,859, filed Feb. 26, 1991.

BACKGROUND OF THE INVENTION

1. Field of the Invention

The present invention relates to an information recording medium reproducing apparatus for reproducing information from a recording medium such as video disc with digital audio sounds, which carries thereon an analogue video signal and a digital signal such as a digital audio signal.

2. Description of the Related Art

For instance, in an optical video disc with digital audio sounds, a method whereby graphics information such as characters, figure, or the like (hereinafter, referred to as a title) is recorded as a subcode of digital audio signals has been known.

In case where such a recording medium is reproduced to obtain a video signal and a picture corresponding to the video signal is displayed on a screen of a display apparatus such as a CRT or the like, the title is superimposed onto the reproduced picture plane and displayed.

On the other hand, although there is a demand for the operator to search (retrieve) a desired picture by using a special title as a target, the conventional information recording medium reproducing apparatus executes the searching operation on the basis of the frame number of the video signal assigned to each frame. Therefore if the operator tries to search while watching the title as a target, the searching operation command must be repeatedly issued at many times while observing the titles displayed, so that it is difficult to extract the picture plane corresponding to the desired title display.

SUMMARY OF THE INVENTION

It is, therefore, an object of the invention to provide an information recording medium reproducing apparatus which can easily execute the searching operation using a title as a target in the case of reproducing an information recording medium on which a graphics information signal of a title or the like was multiplex-recorded as a subcode.

According to the invention, there is provided an information recording medium reproducing apparatus having play means for playing an information recording medium carrying thereon an information signal including a video signal and a digital signal including a digital audio signal with a graphics data signal as a subcode and reproducing said information signal, comprising: extract means for extracting the analogue video signal and the graphics data signal from the reproduced information signal first detecting means for detecting an identification signal of every data unit of the graphics data signal; second detecting means for detecting address signals corresponding to frames of a video signal; memory means for storing at least one of the address signals from the second detecting means corresponding to the identification signal from the first detecting means; searching means for generating a search signal according to a searching operation command; reading means for reading out the address signal from the memory means in correspondence to the search signal; and jump destination address instructing means for shifting a reading point of the play means to a position corresponding to the address signal which was read out.

According to the information recording medium reproducing apparatus of the invention, the identification signal of every data unit of the graphics information signal as a subcode which has been multiplexed and recorded into the information signal is detected and the address signal of the frame of the information signal corresponding to the identification signal is stored. When a searching operation command is received from the operator the stored address signal corresponding to the search signal is read out and the reading point of the pickup is moved to the position corresponding to the address signal which has been read out.

BRIEF DESCRIPTION OF THE DRAWINGS

FIG. 1 is a block diagram showing an embodiment of the invention; and

FIG. 2 is a diagram showing a part of the operation of the embodiment.

DETAILED DESCRIPTION OF A PREFERRED EMBODIMENT

An embodiment of the invention will be described in detail hereinbelow with reference to the accompanying drawings.

In FIG. 1, a disc 1 is carries thereon an information signal formulated in such a manner that a frequency modulated analogue video signal exists within a higher band side and a digital signal having a digital audio signal as a main code and a graphics data signal as a subcode exists within a lower band side.

The disc 1 is rotated by a spindle motor 2. The recorded signal on the disc 1 is read out by a pickup 3. The pickup 3 has therein a laser diode, an objective lens, a focusing actuator, a tracking actuator, a photodetector, and the like. A laser beam is irradiated onto a desired recording track on the disc 1, the reflected laser beam is detected by the photodetector, and the recording signal can be read. The pickup 3 is held by a carriage (not shown) which is moved in the radial direction of the disc 1 by a carriage motor 4. The spindle motor 2 and the carriage motor 4 rotate the disc 1 and move the carriage by controlling a servo circuit 7 by a player controller 6 in response to operation commands from an operating section 5 such as a keyboard.

The information signal on the disc 1 is read at a reading point of the pickup 3 and is photoelectrically converted into an electric signal. After that, the electric signal is issued therefrom as a read signal including an RF signal and is amplified by an RF amplifier 8. Then, the amplified signal is supplied to a high pass filter 9 and a low pass filter 10. The high pass filter 9 separates and extracts only the RF video signal in a high band portion in the read signal and supplies to a frequency demodulator 11. The RF video signal is frequency demodulated by the demodulator 11 and is transmitted through a signal processing circuit (not shown), by which a signal dropout compensation, a chrominance signal separation, and the like are executed. After that, the signal is supplied as a compound video signal to a synthesizing circuit 12 and is also supplied to a sync separating circuit 13 and a gate circuit 14.

On the other hand, the low pass filter 10 separates and extracts the subcode signal and digital audio signals in a low band portion in the read signal and supplied to an EFM demodulating circuit 15. The demodulator 15 converts the subcode into the digital signal of eight bits and is transmitted through a signal processing circuit (not shown), by which a deinterleave, an interpolation, an error correction, and the like are executed. After that, the processed signal is supplied to a subcode extracting circuit 16. The subcode extracting circuit 16 extracts the subcode of one pack comprising 24 symbols each of which consists of six channels of R, S, T, U, V, and W called user's bits. The extracted subcode is supplied as graphics data to a graphics decoder 17. A preset memory command which is for initialization of the data portion is inserted in the leading area of the data portion representing a title in the graphics data.

The data portion representing a title is supplied to the synthesizing circuit 12 and is superimposed into the composite video signal and supplied to a display driving circuit 18. The composite video signal including the graphics data which has been subjected to various processes such as electric power amplification, gain control, impedance matching, and the like by the display driving circuit 18 is supplied through an output terminal 19 to a display apparatus (not shown) such as a CRT or the like, so that an image is displayed.

The graphics data in the CD format includes a group of twenty-four (24) number of symbols each having six (6) bits called the so-called "pack". A pack called "PRESET MEMORY" includes a second symbol "000 001" representing the preset memory command. Sixteen numbers of the "PRESET MEMORY" packs are, for example, disposed at the leading area of a program area. Therefore, the preset memory command which is issued from the graphics decoder 17 is supplied to a subcontroller 21 and is used as an identification signal to search a head of a group of data according to the invention.

The gate circuit 14 extracts the frame number, that is, the address existing in a vertical blanking period of the composite video signal on the basis of a gate pulse signal from the sync separating circuit 13 and the composite video signal from the frequency demodulating circuit 11. The extracted address is supplied to the subcontroller 21 via an address buffer circuit 20.

In the subcontroller 21, the addresses corresponding to the preset memory commands are time sequentially stored into a memory 22. Such a situation will be further described in detail with reference to FIG. 2. FIG. 2 diagrammatically shows a portion of a track which carries thereon an FM composite video signal and the EFM CD format signal containing several preset memory command data containing portion. The preset memory command data containing portion is inserted at the head portion of each graphics data portion. Each of the preset memory command data containing portion includes, for example, sixteen (16) number of preset memory command packs. As will be obviously understood from the diagram, if preset commands exist during reproduction, the frame numbers, i.e. addresses corresponding to the preset memory commands are sequentially stored into a predetermined number of (for example, five) storage areas in the memory 22. Five latest address data are updated and stored into those storage areas. In the diagram, new address data is stored as the order of the storage area is low.

When the operation intends to search the title which has been already displayed, a search command from the manual section 5 is transmitted through a search designating circuit 23 and a search designation signal is given to the subcontroller 21. The subcontroller 21 reads out an address which is, for example the last address corresponding to the search designation signal from the memory 22 and supplies to a jump destination designating circuit 24. The subcontroller 21 read out an address from the memory 22 which is positioned n number of times preceding to the lastly memorized address, the numeral n representing the operation times of a key in the manual section 5. The circuit 24 indicates a jump target frame to the player controller 6. The player controller 6 controls so as to move (jump) a carriage (not shown) which holds the pickup 3 to a reading point of the instructed target frame on the disc 1. In FIG. 2, the address data in the second storage area from the top in the diagram denotes the search designation address. The reading point of the pickup 3 is jumped to the target frame of such an address, namely, frame number and the reproduction is restarted.

On the other hand, the EFM demodulated digital audio signals are transmitted through a D/A converter 25, low pass filters 26L and 26R, amplifiers 27L and 27R, and the like and are output from output terminals 28L and 28R.

In the above embodiment, the data included in the video signal has been used as address data which is stored in correspondence to the preset memory command. However, address data (time data) included as a subcode of the digital audio signals can be also used.

Although the above embodiment has been described with respect to the case of reproducing the video disc, the invention can be also applied to the case of reproducing a compact disc on which digital audio signals including a graphics information signal as a subcode were recorded. In this case, address data included in the subcode is used.

As described above, according to the information recording medium reproducing apparatus of the invention, the identification signal existing in the head of every data unit of the graphics information signal which was multiplexed and recorded into the information signal is detected, the frame number, that is, the address of the information signal corresponding to the identification signal is stored, and when the search command is received, the address according to the content of the search command is read out, the reading point of the pickup is moved to the position corresponding to the address, and the picture plane corresponding to a desired title can be easily extracted.

What is claimed is:

1. An information recording medium playing apparatus comprising play means for playing an information recording medium, said recording medium carrying thereon an information signal including a digital signal having graphics data, said graphics data including a plurality of data units each containing an identification signal positioned at a head portion of the data unit, said graphics data carried as a subcode signal of the digital signal, the apparatus further comprising:
   detecting means for detecting said identification signal from said information signal during a play operation;
   extracting means for extracting an address signal from the information signal each time when said detecting means detects said identification signal;
   memory means for storing a predetermined number of extracted address signals from said extracting means in memory locations of said memory means sequentially in the order in which the address signals are extracted from the information signal;

searching means for generating a search designated signal in response to a searching operation command applied thereto, said search designated signal specifying a particular memory location corresponding to one of the stored extracted address signals;

reading means for reading out one of the predetermined number of address signals form said memory means in response to said search designated signal; and jump means for determining the read-out one of the address signals as a destination address and for positioning a reading point of said play means on said recording medium to a position corresponding to said destination address.

2. An apparatus according to claim 1, wherein said identification signal is a preset memory command in a CD graphics format.

3. An information recording medium playing apparatus according to claim 1, in which said address signal is a time code of the sub-code of said digital signal.

4. An information recording medium playing apparatus according to claim 1, in which said information signal contains a composite video signal multiplexed with said digital signal, said address signal being a frame number disposed within the vertical blanking period of said composite video signal.

5. A method of searching for a graphics information signal on an information recording medium carrying thereon an information signal including a digital signal having said graphics information signal, said graphics information signal including data units each having an associated identification signal positioned at a head portion of the data unit, said graphics information signal carried as a subcode of the digital signal, the method comprising the steps of:

playing at least a portion of the information signal;

detecting each identification signal in the portion of the information signal played;

extracting, for each detected identification signal, an address signal from said information signal that is coincident with the detected identification signal;

storing a predetermined number of the extracted address signals in memory locations of a memory sequentially int eh order that the address signals are extracted;

generating a search signal according to a searching operation command specifying a particular memory location corresponding to one of the stored extracted address signals;

reading out the stored address signal, corresponding to the particular memory location, from the memory in response to said search signal; and moving a reading point to a position corresponding to said particular address signal.

* * * * *